United States Patent [19]

Foster

[11] 4,340,137

[45] Jul. 20, 1982

[54] CANT MOVEMENT AND ALIGNING MECHANISM

[75] Inventor: Theodore C. Foster, Eugene, Oreg.

[73] Assignee: Opcon, Inc., Everett, Wash.

[21] Appl. No.: 215,239

[22] Filed: Dec. 11, 1980

Related U.S. Application Data

[60] Continuation of Ser. No. 47,332, Jun. 11, 1979, abandoned, which is a division of Ser. No. 890,050, Mar. 27, 1978, Pat. No. 4,205,568.

[51] Int. Cl.[3] ........................ B27B 31/00; B65G 47/22

[52] U.S. Cl. ................................ 198/457; 144/242 M; 144/245 A; 198/434; 198/487

[58] Field of Search .......... 144/242 R, 242 M, 245 R, 144/245 A, 245 B, 245 E; 198/434, 457, 487, 738

[56] References Cited

U.S. PATENT DOCUMENTS

| | | | |
|---|---|---|---|
| 4,086,496 | 4/1978 | Berry | 144/312 X |
| 4,185,672 | 1/1980 | Vit et al. | 144/312 |

*Primary Examiner*—Jeffrey V. Nase

*Attorney, Agent, or Firm*—Christensen, O'Connor, Johnson & Kindness

[57] ABSTRACT

A first conveyor moves cants to a delivery position adjacent to a second conveyor whose axis of movement is transverse to that of the first conveyor. A cant movement and aligning mechanism, which includes an overhead support that supports at least two positioning heads for movement in a direction transverse to the axis of movement of the second conveyor, moves the cant onto the second conveyor. The positioning heads are moved between a position beyond the trailing edge of a cant located at the delivery position and a position overlying the second conveyor. Each of the positioning heads includes a pusher pin and a hold-down pin mounted such that the longitudinal axis of the pusher and hold-down pins are vertically oriented and such that the pusher pin lies beyond the trailing edge of a cant located at the delivery position and the hold-down pin lies in a position between the pusher pin and the second conveyor. Each of the positioning heads includes an extension and retraction mechanism for extending and retracting the pusher and hold-down pins. A control system connected to the positioning heads and the extension and retraction mechanism moves the positioning heads to a position such that the pusher pins lie beyond the trailing edge of a cant at the delivery position. The pusher and hold-down pins are then extended such that the lower end of the pusher pins lie beyond the upper surface of a cant at the delivery position and the lower end of the hold-down pins lie atop the upper surface of a cant at the delivery position. The positioning heads are then moved toward the second conveyor so that the pusher pins impinge on the trailing edge of the cant and move the cant from the delivery position towards the second conveyor. The movement continues until the cant lies in a predetermined position above the second conveyor. Thereafter, the pusher and hold-down pins are retracted.

16 Claims, 27 Drawing Figures

CANT MOVEMENT AND ALIGNING MECHANISM

This is a continuation of application Ser. No. 047,332, filed June 11, 1979, now abandoned, which in turn is a divisional of application Ser. No. 890,050, filed on Mar. 27, 1978, now U.S. Pat. No. 4,205,568.

BACKGROUND AND GENERAL STATEMENT OF THE INVENTION

My invention pertains to an apparatus for moving and aligning cants in relation to edging saws or cutters, chippers, or band saws to optimize the yield from the cant.

In the lumber industry it has been common practice to control the position of a cant on a slat bed conveyor feeding edging saws by visual evaluation of an operator, after which the cant is fed into the edging saws. This practice results in low yield from the cant or boards with excessive wane resulting in scrap. Production rate is controlled by the ability of the operator to judge and set the cant relative to the edging saws.

The manual positioning of the cant in relation to the edging saws is slow and tedious and subject to operator mistakes. It is the general object of the present invention to provide an apparatus which will move and position a cant in relation to edging saws.

Another object of this invention is to position a cant in relation to edging saws to yield maximum production.

Another object of this invention is the provision of equipment that is highly accurate.

Another object of this invention is the provision of a new and improved cant movement and aligning mechanism.

Broadly considered the foregoing and other objects of this invention are accomplished by directing a pair of positioning heads to position a cant in relation to the edging saws and transferring the cant to a longitudinal conveyor for feeding the edging saws.

The objects of the invention are further achieved by providing an apparatus for accomplishing the foregoing functions.

DESCRIPTION OF THE PREFERRED EMBODIMENT OF THE INVENTION

Figures 1, 2, 3, 4, 5, 6, 7, 8, 9, 10, 11, 12, 13, 14, 15:
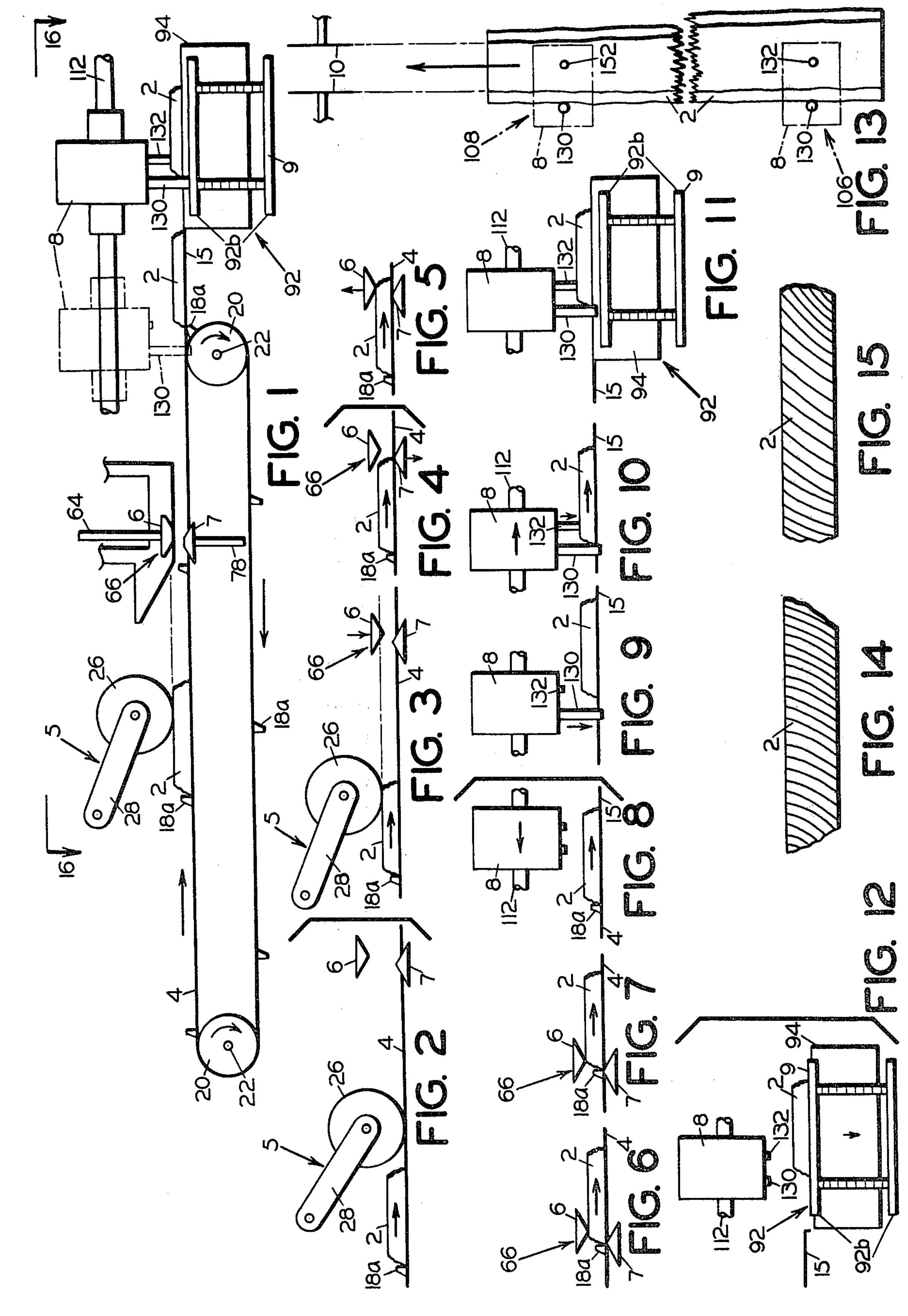
FIG. 1 is a schematic elevation view showing the elements of an apparatus for optimizing the edge cut of boards from cants with which the movement and aligning mechanism of the invention is useful.
FIGS. 2 through 13 are schematic illustrations of the functional steps performed by the apparatus illustrated in FIG. 1.
FIGS. 14 and 15 are alternate configurations of a cant.

The principal sequence of events of an apparatus for optimizing edge cut of boards from cants with which the invention is useful is illustrated in FIGS. 1 through 13. A cant 2 is moved by a feed conveyor 4 (FIGS. 1 and 2), past a thickness detector 5 that measures the thickness of the cant and positions proximity sensor units 6 relative to the cant surface (FIG. 3). The cant 2 is also conveyed by the feed conveyor past lower and upper sensors 7 and 6, which respectively sense the lower and upper cant leading edges (FIGS. 4 and 5) to initiate a series of pulses to a computer and sense the lower and upper cant trailing edges (FIGS. 6 and 7) to stop the pulses, thereby determining the cant width. A computer determines optimum cant yield for the cant thickness and width as positioning heads 8 move to the discharge end of the feed conveyor 4 (FIG. 8). The computer directs the positioning heads to: (i) lower pusher pins 130 (FIG. 9) and hold down pins 132 (FIG. 10); (ii) position the cant 2 relative to longitudinal conveyor 9 (FIG. 11); and, (iii) withdraw the pusher and hold down pins after transferring the cant to the longitudinal conveyor 9 (FIG. 12) for feeding into edging saws 10 (FIG. 13). The present invention is directed to the cant moving and aligning mechanism.

Figure 16:
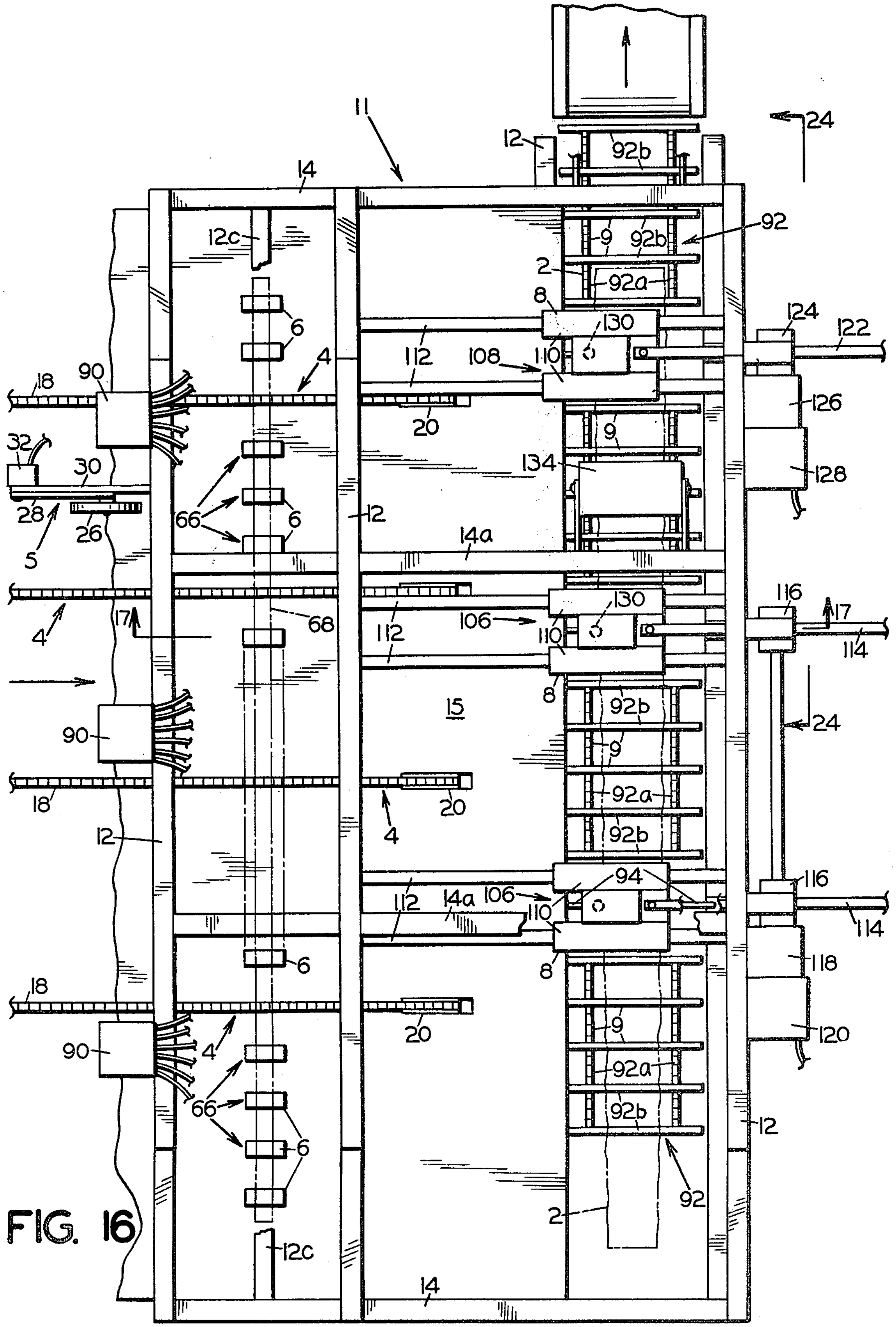
FIG. 16 is a plan view along the line 16—16 of FIG. 1.
Figure 17A:
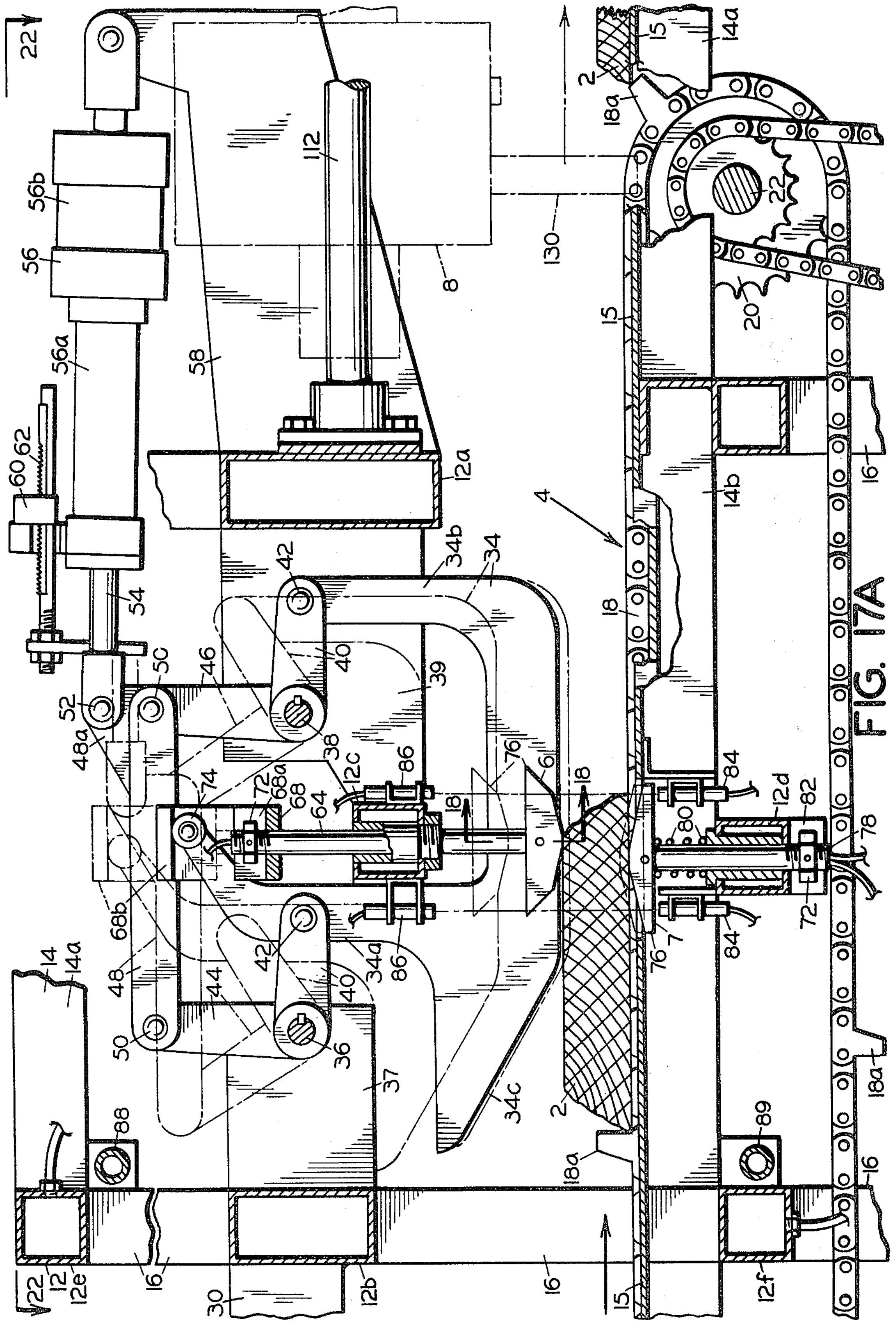
FIGS. 17A and 17B are sectional elevation views taken along the line 17—17 of FIG. 16.
Figure 17B:
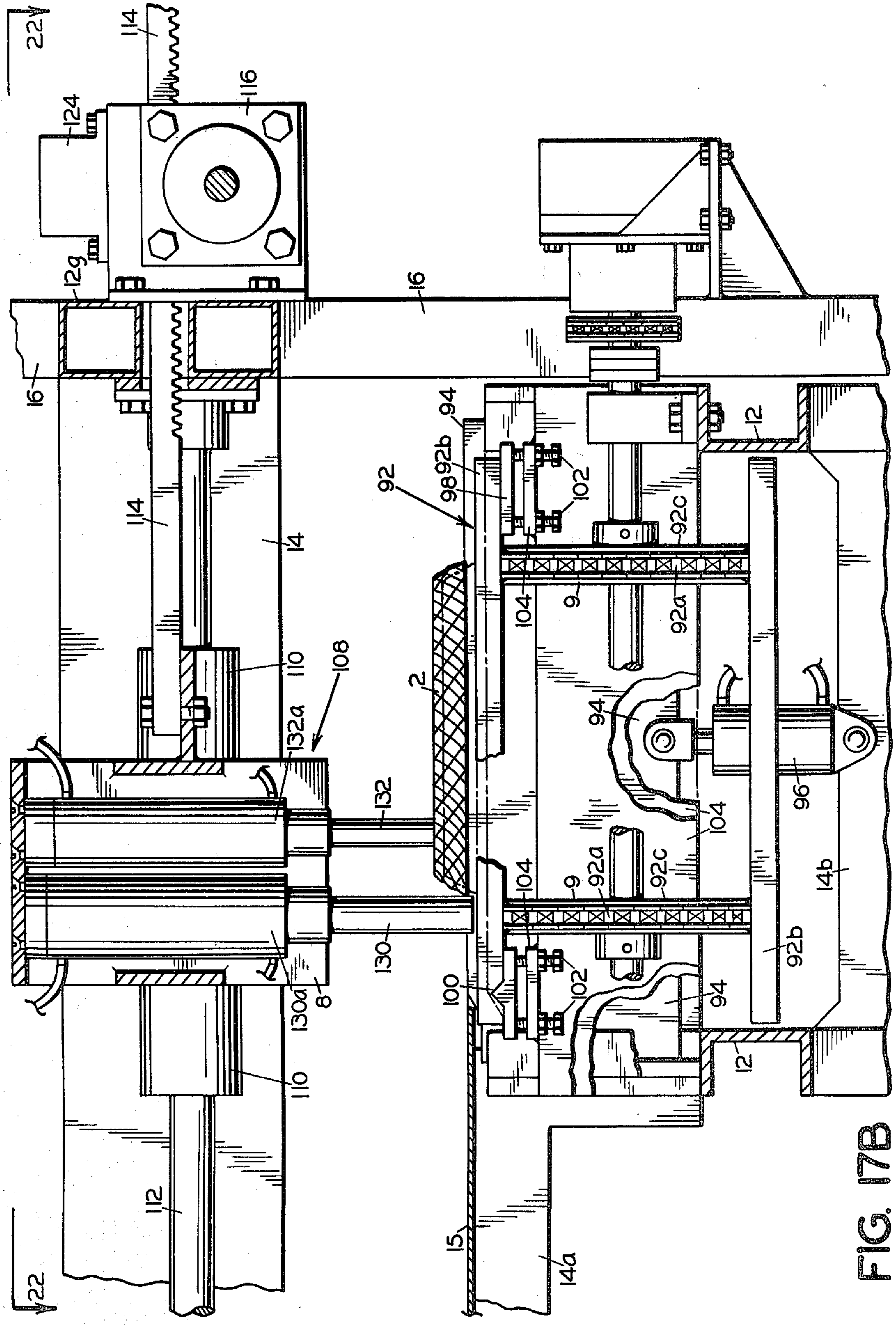

The apparatus, with particular reference to the drawings, to accomplish the foregoing sequence is supported on a frame 11 FIG. 16 having longitudinal members 12, transverse members 14 and vertical members 16 FIGS. 17A and 17B. The apparatus supported by the frame comprises the following.

A. CANT VOLUME MEASUREMENT

The feed conveyor 4 (FIGS. 16 and 17A) comprises a plurality of parallel chains 18 driven by sprockets 20 supported on a common shaft 22 driven by a hydraulic motor, not shown. The chains 18 are provided with spaced lug links **18*a* adapted to contact the trailing edge of the cant 2. A pulse generator 24 shown in block form in FIG. 26** comprises a timing belt driven by the feed conveyor drive thereby establishing a direct relation between the conveyor speed and the pulse intervals to be employed by the computer in determining the cant width.

Positioned above the feed conveyor is a thickness detector 5 (FIG. 16) comprising a wheel 26 mounted on a pivoted arm 28 supported by bracket 30 from frame member **12*b*. Connected to the pivot shaft is a potentiometer 32**.

Positioned between longitudinal frame members **12*a* and 12*b* (FIG. 17A) are longitudinally spaced hold down shoes 34 having upward extending arms 34*a* and 34*b* and an upward sloping forward edge 34*c*. Extending longitudinally between and parallel to frame members 12*a* and 12*b* are shafts 36 and 38 supported by frame brackets 37 and 39** respectively. Secured to the shafts 36 and 38 are lever arms 40. Pins 42 connect the lever arms 40 to the upward extending arms 34a and 34b of the shoes 34 providing support of the shoes by the shafts 36 and 38. Secured to the shafts 36 and 38 are upward extending arms 44 and 46 respectively, interconnected by link member 48 through pins 50, thereby producing vertical movement of the shoes 34 by movement of the link member 48. An upward extension 48a of the link member 48 provides for a pin connection 52 to the piston rod 54 of the cylinder assembly 56. The cylinder assembly 56 is pivotally supported at its opposite end on bracket 58 extending from longitudinal frame member 12a. Mounted on the cylinder assembly 56 is a position sensing potentiometer 60 actuated by rack 62 connected to piston rod 54. The potentiometer 60 functions in conjunction with potentiometer 32. The cylinder assembly 56 comprises a double acting hydraulic cylinder portion 56a and a single acting pneumatic portion 56b. The position of the piston rod 54 is directed by the signal of the thickness gauge potentiometer 32 thereby establishing the position of the lower edge of the shoes 34 relative to the upper surface of the cant 2, the shoes normally being positioned slightly above the upper cant surface. The pneumatic portion 56b of the cylinder assembly 56 provides a cushion in the event the shoes 34 are positioned below the cant surface.

Figures 18, 19, 20, 21, 22, 23:
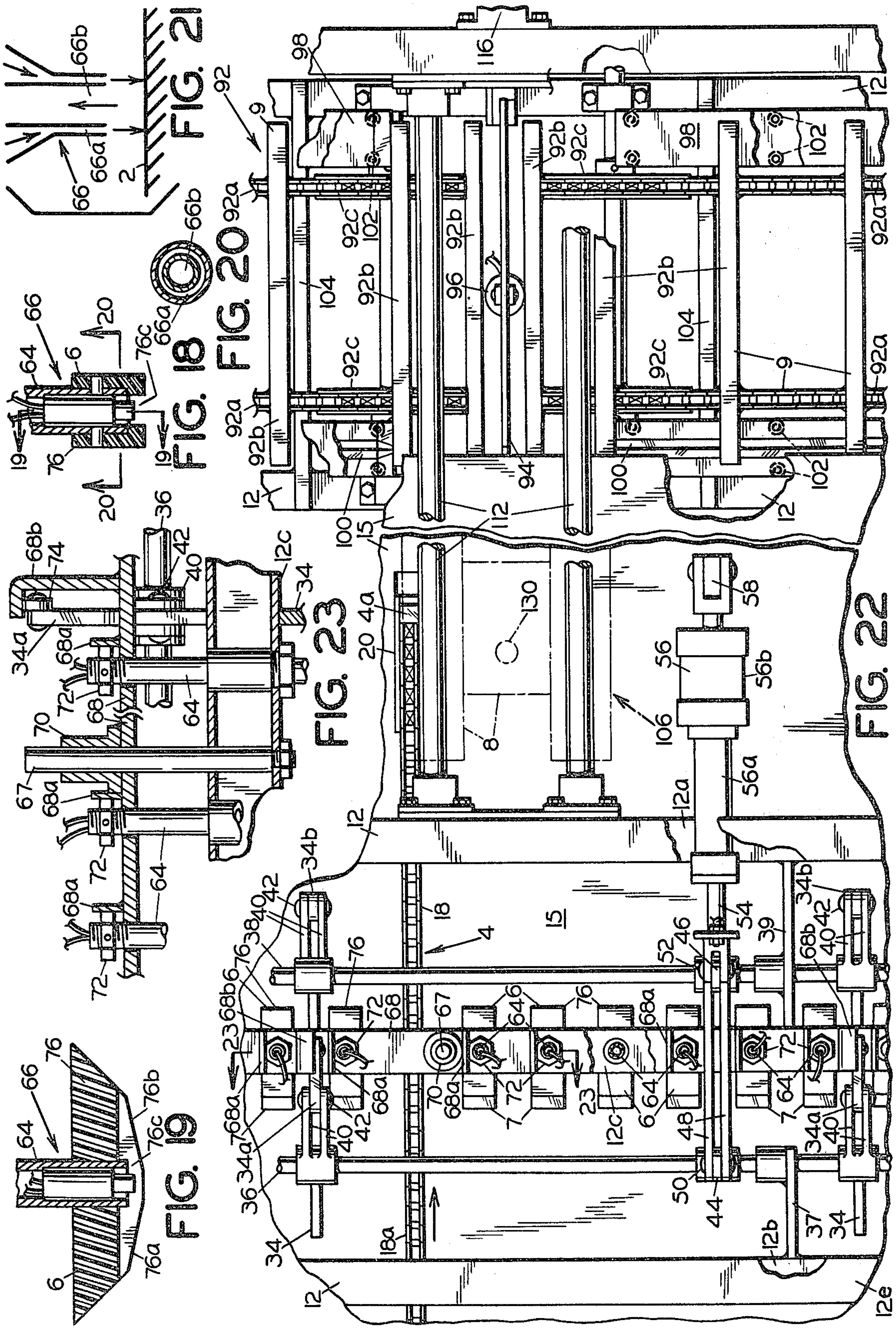
FIG. 18 is a fragmentary elevation view along the line 18—18 of FIG. 17A.
FIG. 19 is a fragmentary cross-section elevation along the line 19—19 of FIG. 18.
FIG. 20 is a partial cross-section along the line 20—20 of FIG. 18.
FIG. 21 is a schematic cross-section along the line 19—19 of FIG. 18.
FIG. 22 is a fragmentary plan view illustrating in more detail a portion of FIG. 16.
FIG. 23 is a fragmentary cross-sectional elevation along the line 23—23 of FIG. 22.

Slidably supported in longitudinal frame member 12c (FIG. 17A) are a plurality of sensor units 6 comprising a sensor tube 64, supporting in the lower end a pneumatic proximity sensor 66 (FIG. 18). Projecting vertically from the longitudinal frame member 12c between the positions of the sensor tubes 64 are guides 67 FIGS. 22 and 23, which slideably position bar 68 having guide bushings 70. The upper end of each sensor tube 64 extends through clearance holes in the bar 68 and is provided with a vertical positioning nut 72 pinned to the sensor tube 64. Alignment of the sensor tubes 64 is provided by upward projecting members 68a positioned in close proximity to the flat side of the nuts 72. Nut adjustment is accomplished by raising the sensor tube so the nut 72 clears member 68a. The bar 68 is supported in its vertical position by angular bracket 68b in contact with wheel 74 on the upward extending arms 34a of the shoes 34, thereby fixing the relation of the sensor unit 6 relative to the shoes 34 between the passing of cants 2 under the sensor units.

Surrounding the lower end of each sensor tube 64 is a sensor shield 76 (FIG. 19) having lower sloping surfaces 76a and 76b which provide for the cant to raise the sensor tube as it contacts the shield 76. The shield 76 establishes the minimum space between the pneumatic proximity sensor 66 and the cant 2 surface. The sensor tube nut 72 is adjusted to permit the lowest point of the shield 76 to be below the lower surface of the shoes 34 by an amount that assures the shield contacting the cant. The clearance shown in FIG. 23 between the nut 72 and the bar 68 is the vertical rise of the sensor tube when the shield 76 is in engagement with the cant surface. The sensor unit maintains the shield in contact with the cant by gravity.

A plurality of lower sensor units 7 having a sensor tube 78 are slidably supported on lower longitudinal frame member 12d (FIG. 17A). Mounted in the upper end of each sensor tube 78 is a pneumatic proximity sensor identical with the upper pneumatic proximity sensor 66, surrounded by identical shield 76. The vertical axis of sensor tubes 78 are offset from the vertical axis of sensor tubes 64 to avoid pneumatic flow interference.

The sensor tube 78 is supported vertically with the shields 76 held in contact with the cant 2 by compression spring 80. The maximum upward position is determined by the nut 72 positioned and pinned on the sensor tube 78. The sensor tube is held in alignment by the close proximity of the flat side of nut 72 with brackets 82 secured to the frame member 12d, as explained for the upper sensor tubes 64.

Mounted between a pair of sensor tubes 78 and positioned forward and rearward of the line of the sensor tubes are a pair of photoelectric cells 84 (FIG. 17A). Aligned with and supported by longitudinal frame member 12c between a pair of upper sensor tubes 64 are light sources 86. These photoelectric cells function in coordination with the thickness detector potentiometer 32 and the shoes 34 positioning potentiometer 60 associated with cylinder 56 to control the vertical position of shoes 34 during the absence of a cant between sensor units 6 and 7.

Figure 26:
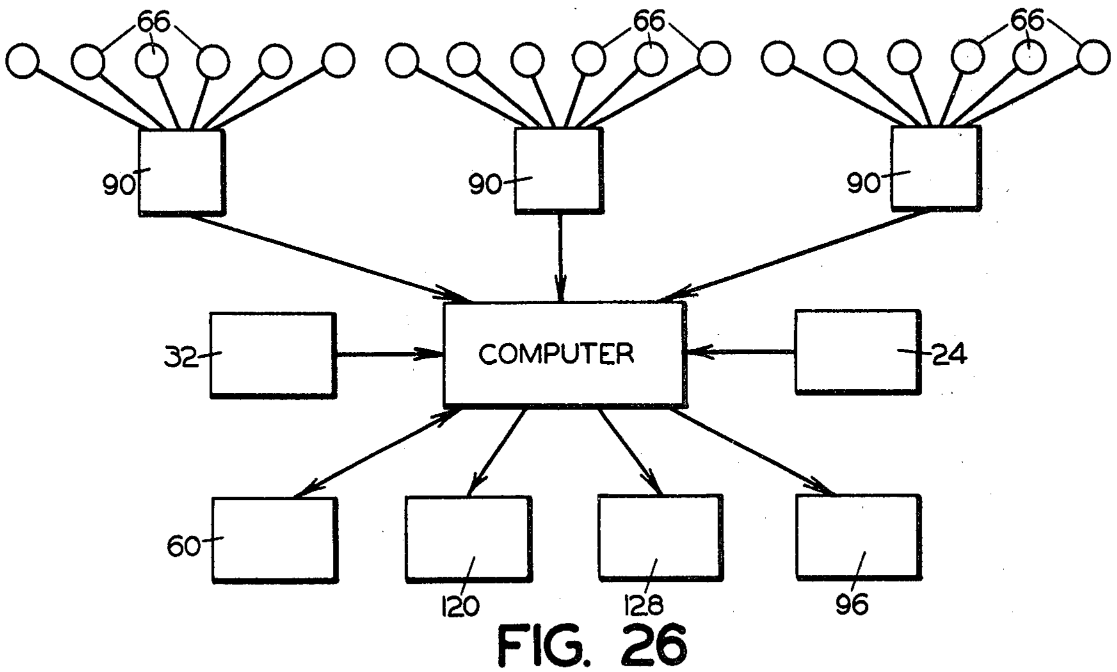
FIG. 26 is a block diagram illustrating the electrical computer interties.

The pneumatic proximity sensor 66 is a standard unit that functions as an edge sensor in my invention. A source of 6 psi air employing longitudinal frame members 12a and 12f (FIG. 17A) as a conduit and 3 psi air from pipes 88 and 89 are supplied to monitor units 90 (FIGS. 16 and 26). Several sensors 66 are provided with air and monitored from each monitor unit. The 6 psi air flows from annular orifice 66a FIG. 21. The three psi air flows from center orifice 66b. The orifices are vertically spaced from the cant surface by the shield 76 provided with a relief slot 76c. When the edge of the cant interferes with air flow from the annular orifice 66a a back pressure is developed in the center orifice 66b causing an increase in the 3 psi pressure. The increase in pressure causes an electrical signal to the computer (FIG. 26) to begin register of the pulses from the pulse generator 24, previously mentioned. Recording of pulses by the computer are stopped when the sensor air flow is no longer interferred with thereby permitting the computer to establish cant width at each sensor position.

During the remaining travel time of the cant 2 on conveyor chains 18 the computer (FIG. 26) combines the information from the thickness detector potentiometer 32 and the sensor units 6 and 7 to determine the edge cut that will produce maximum cant yield.

B. CANT MOVEMENT AND ALIGNING MECHANISM

A cant movement and aligning mechanism formed in accordance with the invention for receiving and position cants as they are discharged from the feed conveyor is next described.

Transverse frame members 14a (FIGS. 16, 17A and 17B) provide skid surfaces in the plane of the upper edge of conveyor chains 18 onto which the cant 2 is discharged.

The longitudinal conveyor 9 (FIG. 11) comprises a series of slat bar conveyors 92 (FIGS. 16, 17b, 22 and 24) having their travel transverse to conveyor chains 18 and spaced from the discharge end of conveyor chains 18 with the top of the slat bars below the upper surface of chains 18 and frame members 14a. Between the slat bar conveyors and transverse to the conveyor travel are lift skids 94. The lift skids 94 are slidably supported in frame slots and raised and lowered by double-acting pneumatic cylinders 96 supported on transverse frame member 14b. In the raised position the upper edge of the lift skid 94 becomes an extension of the upper surface 15 of the frame members 14*a*.

Figure 24:
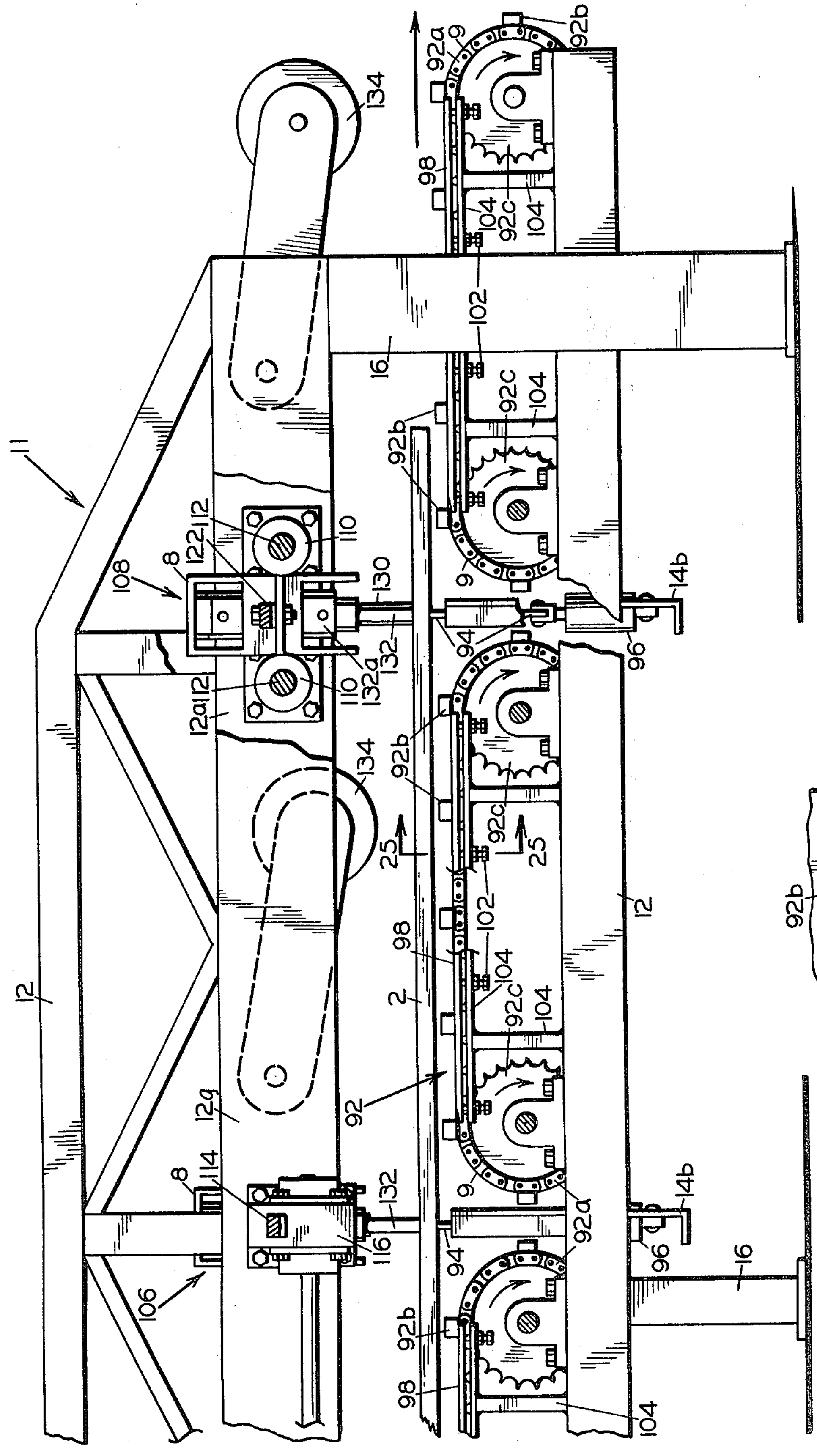
FIG. 24 is a fragmentary elevation along the line 24—24 of FIG. 16.
Figure 25:
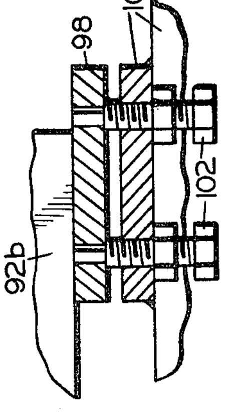
FIG. 25 is a fragmentary cross-section elevation along the line 25—25 of FIG. 24.

Each slat bar conveyor comprises a pair of chains 92*a* FIGS. 16, 17*b* and 24 to which the slat bars 92*b* are attached. The chains 92*a* are supported on and driven by sprockets 92*c* driven by variable speed hydraulic motor, not shown. During the upper horizontal travel the slat bars 92*b* are supported on skids 98 and 100. The skids are adjusted vertically by the screws 102 threaded through bars 104 attached to frame members (FIG. 25). The skids 100 are provided with an inverted V (FIG. 17B) to engage an inverted V-notch in the lower side of slat bars 92*b* to assure straight travel of the slat bars. The several sets of slat bar conveyors form the longitudinal conveyor 9 that feeds the cants 2 into the edging saws 10.

Slidably supported above the conveyor chains 18, surface 15, and conveyors 92 are positioning heads 8 (FIG. 9) comprising identical positioning heads 106 and positioning head 108 (FIGS. 16, 17B and 24). The positioning heads are provided with guide bearings 110 to slidably support the positioning heads on guide rods 112 attached at their ends to longitudinal frame members 12*a* (FIG. 17A) and 12*g* (FIG. 17B).

Positioning heads 106 are positioned along the guide bars 112 by racks 114 attached to the positioning heads and driven through gear boxes 116 by hydraulic motor 118 (FIG. 16 and 17B). Associated with the motor 118 is a logic unit 120 that controls the heads position.

Similarly, positioning head 108 is positioned by rack 122 driven through gear box 124 by hydraulic motor 126 controlled by logic unit 128 (FIGS. 16 and 26).

Each positioning head is provided with a pusher pin 130 that engages the trailing edge of the cant and a hold down pin 132 that engages the upper surfaces of the cant. The pusher pins 130 are actuated by a double acting pneumatic cylinder 130*a* and hold down pins 132 are actuated by a double acting pneumatic cylinder 132*a*. The pusher and hold down pins of one of the positioning heads 106 are used in combination with the pusher and hold down pins of positioning head 108, the particular positioning head 106 to be used being determined by the cant length.

The positioning head 108 in combination with one of the positioning heads 106 position the cant 2 on lift skids 94 as directed by the computer to align the cant with the edger saws 10 (FIG. 13). Hold down wheels 134 are pneumatically actuated to contact the cant after which the pusher pins 130 and hold down pins 132 are raised from the cant. The lift skids 94 are lowered transferring the cant to the slat bar conveyors 92.

C. OPERATION

In operation the cant 2 is placed on feed conveyor chains 18 with its longitudinal axis transverse to the travel of conveyor chains 18. The lugs 18*a* of conveyor chains 18 engage the trailing edge of the cant 2 transporting the cant under thickness detector wheel 26 (FIGS. 1 and 16) changing the position of potentiometer 32 establishing an input to the computer (FIG. 26) and initiating instructions to the hydraulic cylinder 56*a* to position shoes 34 relative to the cant 2 upper surface. The rack driven potentiometer 60 associated with shoe positioning cylinder 56 indicates the proper position of the shoes 34 to the computer and places the upper sensor tube 64 shield 76 in position to contact the upper cant surface.

The conveyor chains 18 transport the cant 2 between the upper and lower sensor tube shields 76 (FIG. 17A) causing sensors 66 to initiate a series of pulses, having a pulse interval related to the conveyor speed, to be counted by the computer for each of the sensor units 6 and 7.

As the trailing edges of the cant 2 are transported past the sensor units 6 and 7 the pulse counting recording is stopped, establishing the width of the upper and lower cant surfaces at each sensor unit.

The computer combines the information from the thickness detector potentiometer 32 with the cant width pulses and determines the alignment of the cant 2 with respect to the edging saws 10 for optimum cant yield as the cant 2 is pushed onto skid 15 by the conveyor chain lugs 18*a*.

The computer directs the logic units 120 and 128 (FIGS. 16 and 26) to energize motors 118 and 126 to move the positioning heads of the cant movement and aligning mechanism of the invention to a position for lowering the pusher pins behind the trailing edge of cant 2. The computer then directs one of the positioning heads 106 and positioning head 108 to lower their respective pusher pins 130 behind the trailing edge of the cant 2 (FIG. 17B). The computer then directs the position heads to move toward the slat bar conveyors 92 into contact with the trailing edge of the cant when the hold down pins 132 are energized to contact the upper cant 2 surface.

The computer through logic units 120 and 128 controlling motors 120 and 126 positions the cant 2 on lift skids 94 in alignment with the edging saws 10.

The computer directs the hold down wheels 134 to lower onto the cant and to raise pusher pins 130 and hold down pins 132 from the cant 2 and to lower lift skid 94 by energizing cylinder 96 transferring the cant 2 to the slat bar conveyors 92 which move the cant longitudinally into and through edging saws 10.

Having thus described my preferred embodiment of the invention, I claim:

1. A cant movement and aligning mechanism for transversely moving a cant from a delivery position to a position on a conveyor such that the cant is longitudinally aligned in a predetermined manner with cutters adapted to longitudinally cut the cant, said cant movement and aligning mechanism comprising:

- overhead support means, overlying said delivery position and said conveyor for supporting at least two positioning heads for movement in a direction transverse to said longitudinal axis along which cants are to be cut;
- at least two positioning heads mounted on said overhead support means for movement in a direction transverse to the longitudinal axis along which cants are to be cut;
- positioning means connected to said at least two positioning heads for moving said at least two positioning heads between a position whereat at least a portion of said positioning heads lies beyond the edge of said cant remote from said conveyor when a cant is in said delivery position and a position whereat said at least two positioning heads generally overlie said conveyor;
- at least two pairs of vertically oriented pins, one pin of each said pairs forming a pusher pin and the other pin of each of said pairs forming a hold down pin, one of said pairs being mounted in each of said positioning heads, such that the pusher pin is mounted in the portion of the positioning head movable to a position beyond the edge of a cant remote from said conveyor when a cant is in said delivery position and the hold down pin is mounted in the positioning head between the pusher pin and the conveyor;

extension and retraction means connected to said pusher and hold down pins for vertically extending and retracting said pusher and hold down pins; and, control means connected to said positioning means and said extension and retraction means for:

moving said at least two positioning heads, with said pusher and hold down pins retracted, to a position such that said pusher pins lie beyond the edge of a cant remote from said conveyor when a cant is in said delivery position;

extending said pusher and hold down pins such that the lower end of said pusher pins lie below the upper surface of a cant at said delivery position and the lower end of said hold down pins lie atop the upper surface of a cant at said delivery position; and, moving said at least two positioning heads toward said conveyor so that said pusher pins impinge on the edge of a cant remote from said conveyor and move said cant towards said conveyor until said cant reaches a predetermined position above said conveyor, said predetermined position being such that said cant is longitudinally aligned in a predetermined manner with said cutters.

2. A cant movement and aligning mechanism as claimed in claim 1 wherein said overhead support means comprises at least two horizontal guide rods, one of said at least two positioning heads mounted on each of said rods, said guide rods being transversely oriented with respect to the axis of movement of conveyor.

3. A cant movement and aligning mechanism as claimed in claim 2 including bearing means mounted between said at least two positioning heads and the guide rods on which said positioning heads are mounted.

4. A cant movement and aligning mechanism as claimed in claim 3 wherein said positioning means comprises:

at least two racks, an end of one of said racks connected to each of said positioning heads;

at least two gear boxes, one of said gear boxes connected to each of said racks; and, hydraulic motor means connected to said gear boxes for actuating said gear boxes so as to cause said gear boxes to move said racks along their longitudinal axes, the longitudinal axes of said racks lying parallel to the longitudinal axes of the guide rods on which said positioning heads are mounted.

5. A cant movement and aligning mechanism as claimed in claim 4 wherein said extension and retraction means include first and second double acting pneumatic cylinders associated with each of said pusher and hold down pins for extending and retracting said pusher and hold down pins.

6. A cant movement and aligning mechanism as claimed in claim 3 wherein said extension and retraction means include first and second double acting pneumatic cylinders associated with each of said pusher and hold down pins for extending and retracting said pusher and hold down pins.

7. A cant movement and aligning mechanism as claimed in claim 1 wherein said extension and retraction means include first and second double acting pneumatic cylinders associated with each of said pusher and hold down pins for extending and retracting said pusher and hold down pins.

8. A cant movement and aligning mechanism comprising:

a first conveyor means for moving cants in a direction transverse to the longitudinal axis of said cants to a delivery position;

second conveyor means having an axis of movement transverse to the axis of movement of said first conveyor means, said second conveyor means lying adjacent to said delivery position on the side thereof remote from the side on which said first conveyor means lies whereby the leading edge of a cant moved by said first conveyor means faces said second conveyor means and the trailing edge of a cant moved by said first conveyor means is remote from said second conveyor means;

overhead support means, overlying said delivery position and said second conveyor, for supporting at least two positioning heads for movement in a direction transverse to the axis of movement of said second conveyor means;

at least two positioning heads mounted on said overhead support means for movement in a direction transverse to the axis of movement of said second conveyor means;

positioning means connected to said at least two positioning heads for moving said at least two positioning heads between a position whereat at least a portion of said positioning heads lies beyond the trailing edge of a cant located at said delivery position and a position whereat said positioning heads generally overlie said second conveyor means;

at least two pairs of pusher and hold down pins, one of said pairs of pusher and hold down pins mounted in each of said at least two positioning heads such that the longitudinal axis of said pusher and hold down pins are vertically oriented and such that said pusher pin lies in the portion of said positioning head movable to a position beyond the trailing edge of a cant located at said delivery position and said hold down pin lies in a portion of said positioning head between said pusher pin and said second conveyor;

at least two extension and retraction means, one of said extension and retraction means mounted in each of said two positioning heads for vertically extending and retracting the pusher and hold down pins mounted in said positioning head; and, control means connected to said positioning means and said extension and retraction means for:

moving said two positioning heads with said pusher and hold down pins retracted to a position such that said pusher pins lie beyond the trailing edge of a cant at said delivery position;

extending said pusher and hold down pins such that the lower end of said pusher pins lie below the upper surface of a cant at said delivery position and the lower end of said hold down pins lie atop the upper surface of a cant at said delivery position;

moving said two positioning heads toward said second conveyor means so that said pusher pins impinge on the trailing edge of a cant located at said delivery position and move said cant from said delivery position toward said second conveyor means, said movement continuing until said cant is in a predetermined position above said second conveyor means; and, retracting said pusher and hold down pins after said cant reaches said predetermined position above said second conveyor means.

9. A cant movement and alignment mechanism as claimed in claim 8 wherein said second conveyor means comprises a plurality of separate conveyor units aligned along a common axis of movement, and including at least two skids lying between said conveyor units; and, means for raising and lowering said skids, said controller connected to said raising and lowering means for raising said skids prior to a cant being moved from said delivery position to a position above said second conveyor means and lowering said skids after said cant has been moved to said predetermined position above said second conveyor means.

10. A cant movement and aligning mechanism as claimed in claim 9 wherein said overhead support means comprises at least two horizontal guide rods, one of said at least two positioning heads mounted on each of said guide rods, said guide rods being transversely oriented with respect to the axis of movement of said second conveyor means; and, including bearing means mounted between said at least two positioning heads and the guide rods on which said positioning heads are mounted.

11. A cant movement and aligning mechanism as claimed in claim 10 wherein said positioning means comprises:

at least two racks, an end of one of said racks connected to each of said positioning heads;

at least two gear boxes, one of said gear boxes connected to each of said racks; and, hydraulic motor means connected to said gear boxes for actuating said gear boxes so as to cause said gear boxes to move said racks along their longitudinal axes, the longitudinal axes of said racks lying parallel to the longitudinal axes of the guide rods on which said positioning heads are mounted.

12. A cant movement and aligning mechanism as claimed in claim 11 wherein said extension and retraction means include first and second double acting pneumatic cylinders associated with each of said pusher and hold down pins for extending and retracting said pusher and hold down pins.

13. A cant movement and aligning mechanism as claimed in claim 8 wherein said extension and retraction means include first and second double acting pneumatic cylinders associated with each of said pusher and hold down pins for extending and retracting said pusher and hold down pins.

14. A cant movement and aligning mechanism as claimed in claim 8 wherein said overhead support means comprises at least two horizontal guide rods, one of said at least two positioning heads mounted on each of said guide rods, said guide rods being transversely oriented with respect to the axis of movement of said second conveyor means; and, including bearing means mounted between said at least two positioning heads and the guide rods on which said positioning heads are mounted.

15. A cant movement and aligning mechanism as claimed in claim 14 wherein said positioning means comprises:

at least two racks, an end of one of said racks connected to each of said positioning heads;

at least two gear boxes, one of said gear boxes connected to each of said racks; and, hydraulic motor means connected to said gear boxes for actuating said gear boxes so as to cause said gear boxes to move said racks along their longitudinal axes, the longitudinal axes of said racks lying parallel to the longitudinal axes of the guide rods on which said positioning heads are mounted.

16. A cant movement and aligning mechanism as claimed in claim 14 wherein said extension and retraction means include first and second double acting pneumatic cylinders associated with each of said pusher and hold down pins for extending and retracting said pusher and hold down pins.

* * * * *

UNITED STATES PATENT AND TRADEMARK OFFICE
CERTIFICATE OF CORRECTION

PATENT NO. : 4,340,137

DATED : July 20, 1982

INVENTOR(S) : Theodore C. Foster

It is certified that error appears in the above-identified patent and that said Letters Patent are hereby corrected as shown below:

Claim 2, Column 7, line 35 — After "said" (first occurrence) insert --guide--.

Signed and Sealed this

*Twenty-first* Day of *December 1982*

[SEAL]

*Attest:*

GERALD J. MOSSINGHOFF

*Attesting Officer* — *Commissioner of Patents and Trademarks*